(12) United States Patent
Ellard

(10) Patent No.: US 7,844,774 B2
(45) Date of Patent: Nov. 30, 2010

(54) EXTENSIBLE FINGERPRINTING FUNCTIONS AND CONTENT ADDRESSED STORAGE SYSTEM USING THE SAME

(75) Inventor: Daniel J. Ellard, Belmont, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 1246 days.

(21) Appl. No.: 11/280,502

(22) Filed: Nov. 16, 2005

(65) Prior Publication Data

US 2007/0113091 A1    May 17, 2007

(51) Int. Cl.
*G06F 12/00* (2006.01)

(52) U.S. Cl. .................. 711/108; 382/115; 382/116; 711/E12.07

(58) Field of Classification Search ............ 711/108
See application file for complete search history.

(56) References Cited

U.S. PATENT DOCUMENTS

| | | | | |
|---|---|---|---|---|
| 5,892,829 | A * | 4/1999 | Aiello et al. ............ | 713/180 |
| 5,970,497 | A * | 10/1999 | Burrows ............ | 707/102 |
| 6,351,755 | B1 * | 2/2002 | Najork et al. ............ | 715/206 |
| 7,627,613 | B1 * | 12/2009 | Dulitz et al. ............ | 1/1 |
| 2002/0083060 | A1 * | 6/2002 | Wang et al. ............ | 707/10 |
| 2005/0010792 | A1 * | 1/2005 | Carpentier et al. ............ | 713/193 |
| 2005/0085217 | A1 * | 4/2005 | Lim ............ | 455/410 |
| 2005/0162288 | A1 * | 7/2005 | McCanne et al. ............ | 341/51 |
| 2007/0110089 | A1 * | 5/2007 | Essafi et al. ............ | 370/420 |

OTHER PUBLICATIONS

Val Henson, Sun Microsystems, "An Analysis of Compare-by-hash", pp. 1-6.
Daniel Ellard, "Extensible Fingerprinting and its Applications for Content-Addressed Storage", Apr. 12, 2005, pp. 1-8.

* cited by examiner

*Primary Examiner*—Hetul Patel
*Assistant Examiner*—Hamdy S Ahmed
(74) *Attorney, Agent, or Firm*—Brooks Kushman P.C.

(57) ABSTRACT

An extensible fingerprint comprised of an ordered list of fingerprints generated by applying each of a plurality of distinct fingerprinting functions to the content of a data item. The extensible fingerprint can be extended by using a new fingerprinting function to compute a new fingerprint and adding the new fingerprint to the list so that the old extensible fingerprint of a data item is used as a prefix of the new extensible fingerprint for that data item. Thus, the fingerprint can be incrementally extended over time. A content-addressed storage system uses extensible fingerprints as addresses and can also change over time.

14 Claims, 6 Drawing Sheets

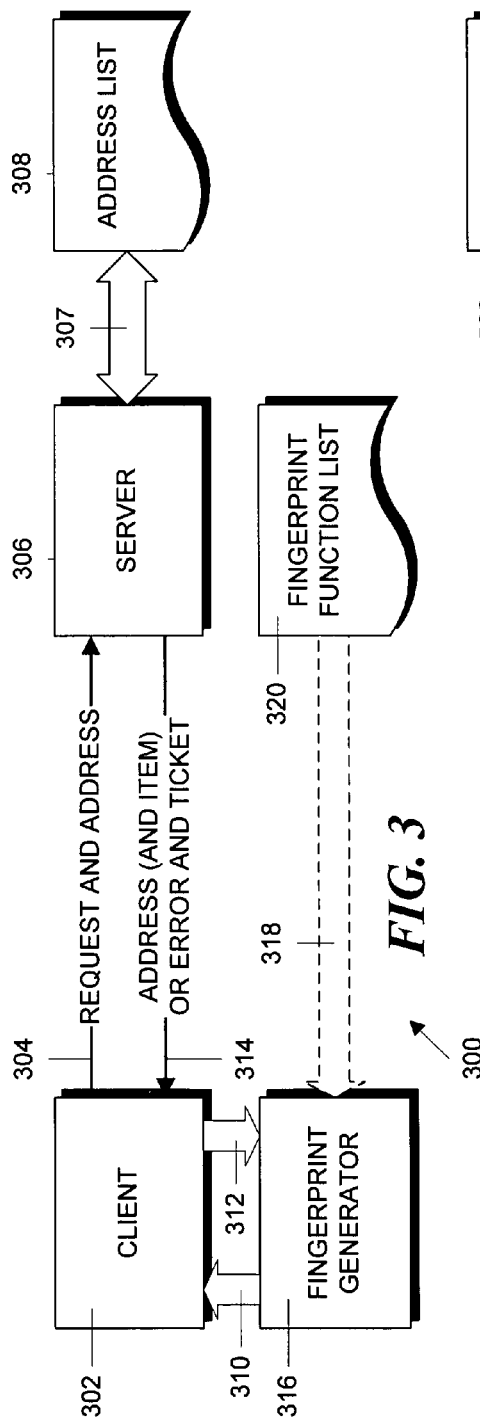
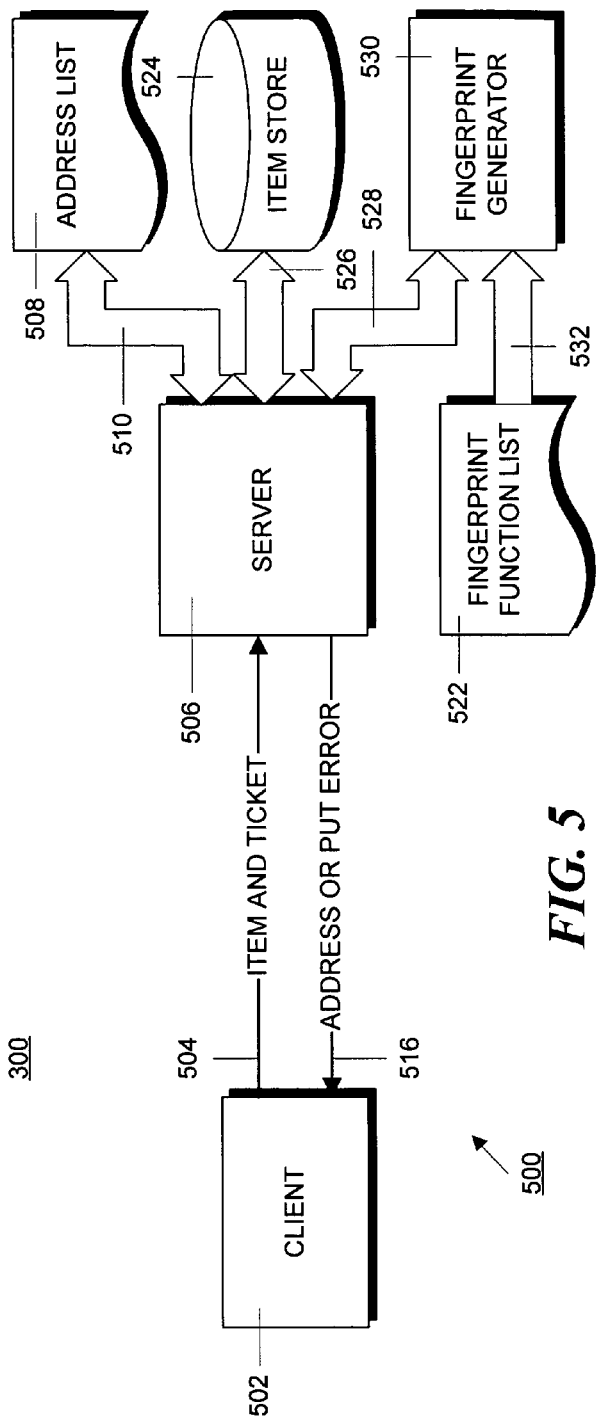

EXTENSIBLE FINGERPRINTING FUNCTIONS AND CONTENT ADDRESSED STORAGE SYSTEM USING THE SAME

BACKGROUND

Many modern storage systems are based on a technique called "content-addressed storage". The general principle of content-addressed storage is that the content of an item (which may be a file, an object, part of an object, or a block of data) being stored in a data storage is used to define the logical address in the storage at which that item is stored. In such systems, logical addresses are typically generated by using a "hash function" to process item content in order to produce the logical address.

A hash function is a deterministic function that maps a digital bit string in which the bits have arbitrary values and the string has an arbitrary length to another digital bit string with a fixed length. Because the output string of a hash function is of fixed-size and the number of possible input strings is unlimited, it is inevitable there exist at least two different input strings that produce the same output string when processed by the hash function. Two such input strings are said to "collide" and a "collision" is found when two such input strings are identified.

A "collision-resistant" hash function is a hash function for which there is no known tractable method for examining the function and identifying input strings that collide. There are several known collision-resistant hash functions in current use of which the most widely used is called SHA-1. This function is described in detail in Federal Information Processing Standard Publication 180-1 (SHA), April 1995. The SHA-1 function generates a 160-bit hash of an input bit string. However, recently it has been shown to be less collision-resistant than originally believed. See, for example, the discussion by X. Wang, Y. L. Yin, and H. Yu. at website theory.csail.mit.edu/~yiqun/shanote, February 2005. Another hash function in wide use is called MD5 and is described in "The MD5 message-digest algorithm", R. Rivest available at website faqs.org/rfcs/rfc1321.html, April 1992. However, this function is no longer believed to be collision-resistant. See "How to break MD5 and other hash functions", X. Wang and H. Yu, *Proceedings of Eurocrypt* 2005, May 2005.

In the context of different applications, collision-resistant hash functions are referred to as "message digest" or "fingerprinting" functions. A message digest function produces a message digest as an output while a fingerprinting function produces a fingerprint as an output. For the purposes of the discussion below the term "fingerprinting" will be used. A good fingerprinting function has two important properties. First, if two input strings produce different fingerprints, then the inputs themselves must be different. This property follows from the requirement that the fingerprinting function be deterministic. Second, if two input strings produce the same fingerprint, then it is extremely likely that the two inputs are identical. This property follows from the requirement that the fingerprinting function be collision-resistant.

These two properties provide the basis for the technique known as compare-by-hash or compare-by-fingerprint. This technique treats the fingerprint of an item as its identity. Thus, if two items have different fingerprints, then they must be different, and if they have the same fingerprint then they are assumed to be the same. This technique is very useful in bandwidth-limited systems because arbitrarily large items can be compared by transferring the fingerprints of the items to a common location where they can be compared to determine whether the items are the same rather than requiring the entire items to be transferred. The technique is also useful for commitment protocols.

In particular, the compare-by-hash technique forms the basis for content-addressed storage. In a content-addressed storage system, the fingerprint of an item is used as the logical address of that item in the storage. Depending on the implementation of these systems, an "item" might correspond to a fixed-length data block, a string of arbitrary length (such as a file) or a higher-order object. Since the content of each item defines its logical address, each item stored by the system is stored exactly once. For example, when a large file is copied, no new storage space is required to store the contents of the file copy because the contents of the file copy will have the same fingerprint as the contents of the original file and will thus be stored at the same logical address as the contents of the original file. Thus the cost (in time and space) to copy a large file is reduced to the time required to update the namespace of the file system.

The first well-known implementations of content-addressed storage are the Venti storage system described in "Venti: a new approach to archival storage", S. Quinlan and S. Dorward, *Proceedings of the First USENIX Conference on File and Storage Technologies (FAST '02)*, pages 89-101, Berkeley, Calif., USA, January 2002, The USENIX Association and the Centera system developed by the EMC Corporation, Hopkinton, Mass. as described in "EMC content addressed storage system" at website emc.com/products/systems/centera.jsp, 2003 (Centera is a trademark of the EMC Corporation). The technique of using content-addressed storage has also been embraced by wide-area replicated storage systems like the Pond and OceanStore systems described in "Pond: The OceanStore prototype", S.C. Rhea, P. R. Eaton, D. Geels, H. Weatherspoon, B. Y. Zhao, and J. Kubiatowicz, *Proceedings of the FAST '03 Conference on File and Storage Technologies*, April 2003.

The basic protocol for storing an item in such a content-addressed storage system may be defined in terms of two primitive operations, which are called "lookup" and "put". These lookup and put operations are discussed below in the context of a client and server storage system. In this context, the client is the initiator of a storage operation. The server is responsible for implementing the data storage and related data structures necessary to implement the functionality required by the content-addressed system. This notation does not imply that the client and the server are running on different machines or even in different processes, but is only meant to describe the underlying protocol. For notational convenience, specific instances of fingerprints are described as either "candidate" or "valid" addresses. All fingerprints that are generated by the client are considered to be candidate addresses. If a fingerprint matches the fingerprint for an item that is stored on the server, then it is a valid address of an item stored on that server.

The purpose of a lookup operation is to determine whether or not the server already contains a copy of the item that the client wishes to store—the client presents the server with a candidate address, and the server tells the client whether or not that address is valid. If the item exists (the address is valid) then there is no need for the client to perform any further action.

A conventional lookup operation has two steps. First, the client computes the fingerprint from the content of the item it wishes to store, and sends the fingerprint to the server. Second, the server compares this fingerprint to the set of fingerprints for items it has already stored. If the fingerprint is in this set, then the server sends a copy of the valid address for the item to the client. Otherwise, the server informs the client that it has no such item and sends the client a "ticket" containing the client-computed fingerprint that allows the client to send a copy of that item to the server for storage.

The purpose of a put operation is to actually copy an item to the server. A conventional put operation also has two steps. In the first step, the client sends a ticket it previously obtained and the item to the server. Once the server has a copy of the item, it computes the fingerprint from the item copy to double-check that the re-computed fingerprint matches the fingerprint contained in the ticket. If the two fingerprints do not match, the server rejects the put operation. In the second step, the server writes the item to storage and sends a copy of the valid address to the client.

System designers who use content-addressed storage (or compare-by-hash techniques) typically have two concerns related to the underlying assumptions of these techniques. First, if the number of items stored grows beyond the original design goals, the probability that two different items will have the same fingerprint may become uncomfortably large. This concern may be reduced by using a fingerprinting function that has a very large space (that is, a 256- or 512-bit output). While it is difficult to imagine any application (even one that is global in scale and long-lived) that will create enough unique items to make it likely that a well-designed fingerprinting function will encounter collisions in a space this large, it has already been shown that some contemporary fingerprinting functions have a smaller effective space than the size of their output would suggest, and so there may be cause for concern.

Second, the fingerprinting function may be "broken" by the discovery of a method for identifying colliding strings and it may therefore become feasible for a malicious party to use that method to create items that have the same fingerprints as other different items. Depending on the nature of the storage system and the ability of the malicious party to create such objects, that party may be able to corrupt or violate the correctness properties of the system. The argument has been made that, because a possibility of collisions exists, compare-by-hash and content-addressed techniques should not be used in situations that require absolute data integrity. The counter-argument has been made that the probability of such problems occurring is so small that the benefit of these techniques far outweighs the practical risks.

Consequently, it would be useful if the fingerprinting function could be changed in conventional systems in order to correct problems that appear after the storage system has been in operation. However, changing the fingerprinting function in a conventional content-addressed storage system would require re-fingerprinting the entire data set and, in some conventional systems may invalidate the contents of the data set itself. For example, if fingerprints are encoded within any data objects stored on the server, there is no way for the storage system to determine that these fingerprints must be updated when the fingerprinting function is changed. It is possible to leave the old fingerprints in place, but it is then necessary for the storage system to be involved in every fingerprint comparison.

SUMMARY

In accordance with the principles of the invention, a method and apparatus construct and use an extensible fingerprint that is an ordered list of other fingerprints. The other fingerprints may be generated from the content of an item by a plurality of different fingerprint functions. When a new fingerprint function becomes available, the new function can be used to generate a new fingerprint and the extensible fingerprint extended by adding the new fingerprint to the ordered list. Thus, extensible fingerprints can evolve over time and make use of new advances in fingerprinting functions as they become available, rather than tying the system to a fixed fingerprinting function that might be broken during the lifetime of the system. The inventive extensible fingerprints also preserve the essential properties required by content-addressed storage and compare-by-hash techniques.

In one embodiment, extensible fingerprints are generated by an extensible fingerprinting function. The output of the extensible fingerprinting function is an ordered list of fingerprints generated by an ordered list of distinct fingerprinting functions. However, the list of fingerprinting functions is not chosen when the system is initially deployed, but instead is incrementally extended over time. Thus, when new fingerprinting functions are added to the list, they can be chosen from among the best functions known at that time (instead of being confined to the best functions known when the system was designed).

In another embodiment, the extensible fingerprint is formed from an ordered list of distinct fingerprinting functions by using each function on the list to generate a fingerprint and combining that fingerprint with a composite fingerprint generated from the functions preceding that function on the list. For example, the new fingerprint may be appended to the composite fingerprint. As this latter fingerprint is extended, the old fingerprint of each item becomes a prefix of the new fingerprint. Therefore, it is possible to migrate from an old fingerprinting function to a new fingerprinting function with a minimum of overhead, and old fingerprints (which may be held by clients as references to a specific item) do not become obsolete. In addition, the technique used to generate the fingerprinting function that is used to create each fingerprint is explicit in the fingerprint.

In another embodiment, in accordance with the invention, a content-addressed storage system is implemented in accordance with the principles of the invention by using the inventive extensible fingerprints as addresses. In such as system, after a put operation has returned the stored item, an update of the server list of valid addresses is performed so that the system is incrementally updated.

BRIEF DESCRIPTION OF THE DRAWINGS

FIG. 3 is a block schematic diagram of a lookup operation in a content-addressed storage system that uses extensible fingerprints.

FIG. 5 is a block schematic diagram of a put operation in a content-addressed storage system that uses extensible fingerprints.

DETAILED DESCRIPTION

Figure 1A:
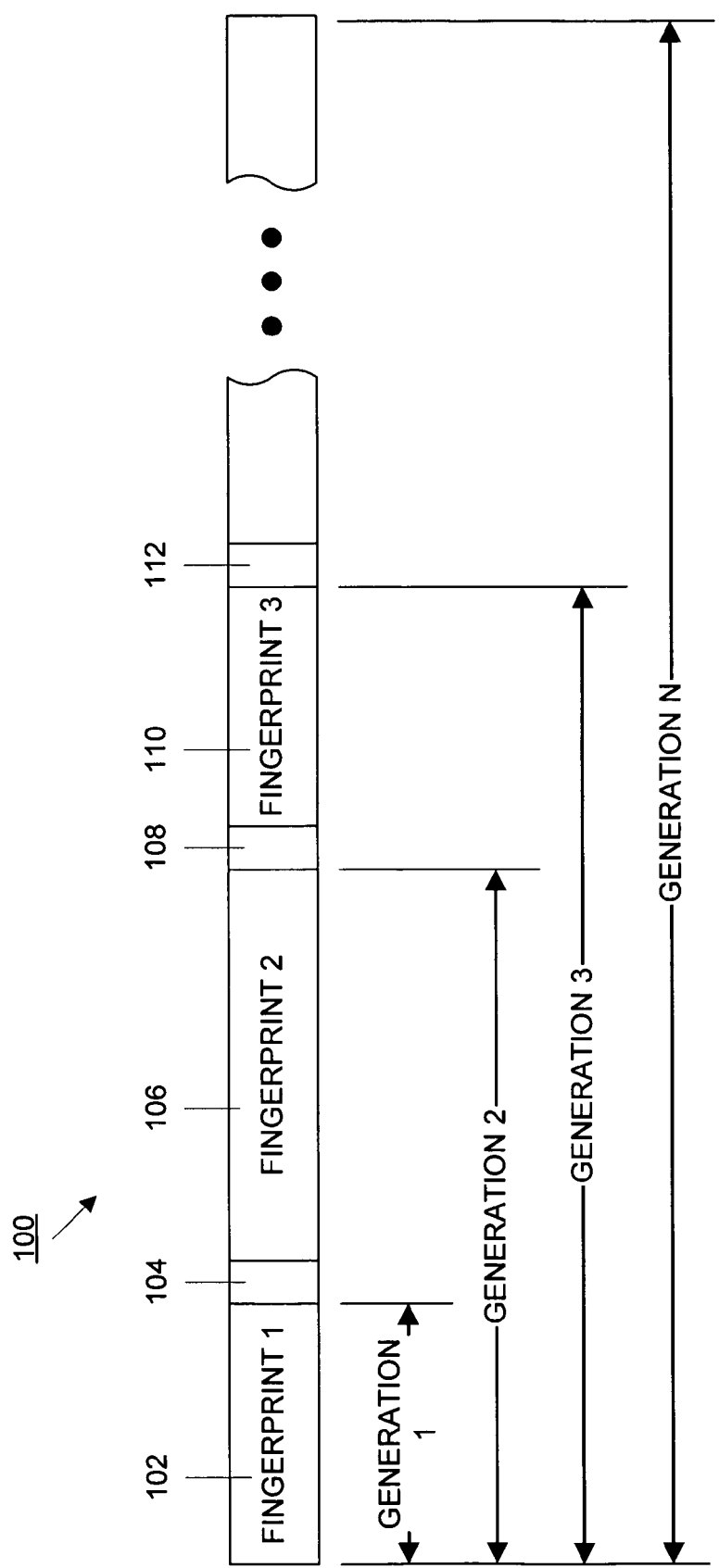
FIG. 1A is a schematic diagram illustrating one embodiment of an extensible fingerprint constructed in accordance with the principles of the invention.

In accordance with the principles of the invention, a fingerprint for an item is built from an extensible fingerprinting function that actually comprises a list of fingerprinting functions. Each fingerprinting function on the list is applied to the content of the item and the resulting fingerprint is appended to an accumulating fingerprint value. In the discussion below, an extensible fingerprinting function $X_i$ is denoted by:

$$\beta_{\alpha,i} = X_i(\alpha)$$

where i is the "generation" of the fingerprinting function, $\alpha$ is the item content, and $\beta_{\alpha,i}$ is the fingerprint output. The generation of a fingerprinting function is the number of fingerprinting functions in the fingerprint function list used to compute the fingerprint or, alternatively, the number of fingerprint functions on the list. The ith, or last, fingerprinting function on the list is denoted as $F_i$. Thus, the list comprises fingerprinting functions $F_1 \ldots F_i$. The fingerprints generated by the functions of the list may be stored in accordance with a variety of well-known techniques, including linked lists and arrays. In these latter cases, the generation of the extensible fingerprint can be determined by determining the length of the list or the array. Alternatively, an extensible fingerprint could be implemented by an object that contains both the extensible fingerprint and the method used to generate that fingerprint.

In one embodiment, each extensible fingerprinting function $X_i$ is defined in terms of earlier generations of extensible fingerprinting functions as follows:

$$X_1(\alpha) = F_1(\alpha) \quad (1)$$

$$X_i(\alpha) = \text{append}(X_{i-1}(\alpha), F_i(\alpha)) \quad (2)$$

for i>1, where the append( ) function appends the second value to the end of the first value. During the appending process, a delimiter is inserted between the first and second values.

Equation (2) may be rewritten as:

$$\beta_{\alpha,i} = \text{append}(\beta_{\alpha,i-1}, F_i(\alpha)) \quad (3)$$

As mentioned above, the append process inserts a delimiter between values $\beta_{\alpha,i}$ and $\beta_{\alpha,i-1}$. As an example, such an extensible fingerprint may be represented by a string of ASCII characters with the characters 0-9 and a-f representing the bits of each fingerprint in hexadecimal code. This is commonly the way the fingerprints generated by the well-known MD5 or SHA1 fingerprinting functions are represented. In this case, a special "reserved" character, or reserved sequence of characters, is used as a delimiter between separate fingerprints of the extensible fingerprint and the string is terminated with a second reserved character or sequence of characters. The term "reserved" in this case means that the reserved character, or reserved character sequence, cannot appear in any fingerprint. With this arrangement, the character string representing the extensible fingerprint can be scanned to count the number of fingerprints present and thus determine the generation of the extensible fingerprint.

An extensible character string fingerprint 100 is schematically illustrated in FIG. 1A which shows an N-generation fingerprint. Fingerprint 1 (102) comprises the first generation of the extensible fingerprint 100. Fingerprint 1 is followed by a delimiter 104. Generation 2 of the extensible fingerprint 100 comprises fingerprints 102 and 106 separated by delimiter 104 and is followed by delimiter 108. Similarly, generation 3 of the extensible fingerprint 100 comprises fingerprint 102, delimiter 104, fingerprint 106, delimiter 108 and fingerprint 110 and is followed by delimiter 112. In the same manner generation N of the extensible fingerprint 100 is comprised of fingerprints 1-N. The preceding generation of extensible fingerprint 100 can easily be determined by scanning the extensible fingerprint from right to left until a delimiter is encountered. The delimiter and the fingerprint to its right are then removed, leaving the preceding generation. The same procedure can be followed with the preceding generation to obtain the next preceding generation. This process can be repeated until the generation 1 is obtained.

In other embodiments, methods other than appending can be used to combine fingerprints to form an extensible fingerprint. In these other methods, one property that must be preserved is that, given an extensible fingerprint with a generation, it must be possible to identify the extensible fingerprint of the immediately preceding generation (and, by induction, all extensible fingerprints of earlier generations) for any object which has that extensible fingerprint without necessarily having access to that object. In the embodiment described above where fingerprints are constructed by appending a new fingerprint to a composite fingerprint, the fingerprint of the immediately preceding generation can easily be determined using the delimiters to remove the last fingerprint from the extensible fingerprint.

Another property, which follows directly from the first property, and must also be preserved, is that the range of extensible fingerprints (that is, the number of unique possible fingerprints) generated by an extensible fingerprinting function of generation i must be exactly the same as the range of extensible fingerprints generated by an extensible fingerprinting function of the immediately preceding generation i−1 multiplied by the range of fingerprints generated by the fingerprinting function added to produce generation i.

In the embodiment discussed above, appending fingerprints to form an extensible fingerprint is a natural and obvious way to preserve both properties. However, there are many other embodiments that involve variations of this embodiment and also meet both properties. As an example, a two-generation extensible fingerprinting uses an SHA1 fingerprinting function for generation 1 and adds an MD5 fingerprinting function for generation 2. One method of combining the two fingerprints to make the extensible fingerprint for generation 2 is to add the SHA1-generated fingerprint (denoted as SHA1) to the MD5-generated fingerprint (MD5), and then append the MD5-generated fingerprint to the resulting sum. The resulting extensible fingerprint would then be as follows:

Generation 1: <SHA1>
Generation 2: <SHA1+MD5, MD5>

With a fingerprint of this type, given the extensible fingerprint of generation 2, the extensible fingerprint of generation 1 can be calculated by scanning the generation 2 extensible fingerprint to determine the fingerprint (MD5) added for generation 2 and then subtracting that fingerprint (MD5) from the remaining extensible fingerprint (SHA1+MD5) to obtain the first generation (SHA1).

Figure 1B:
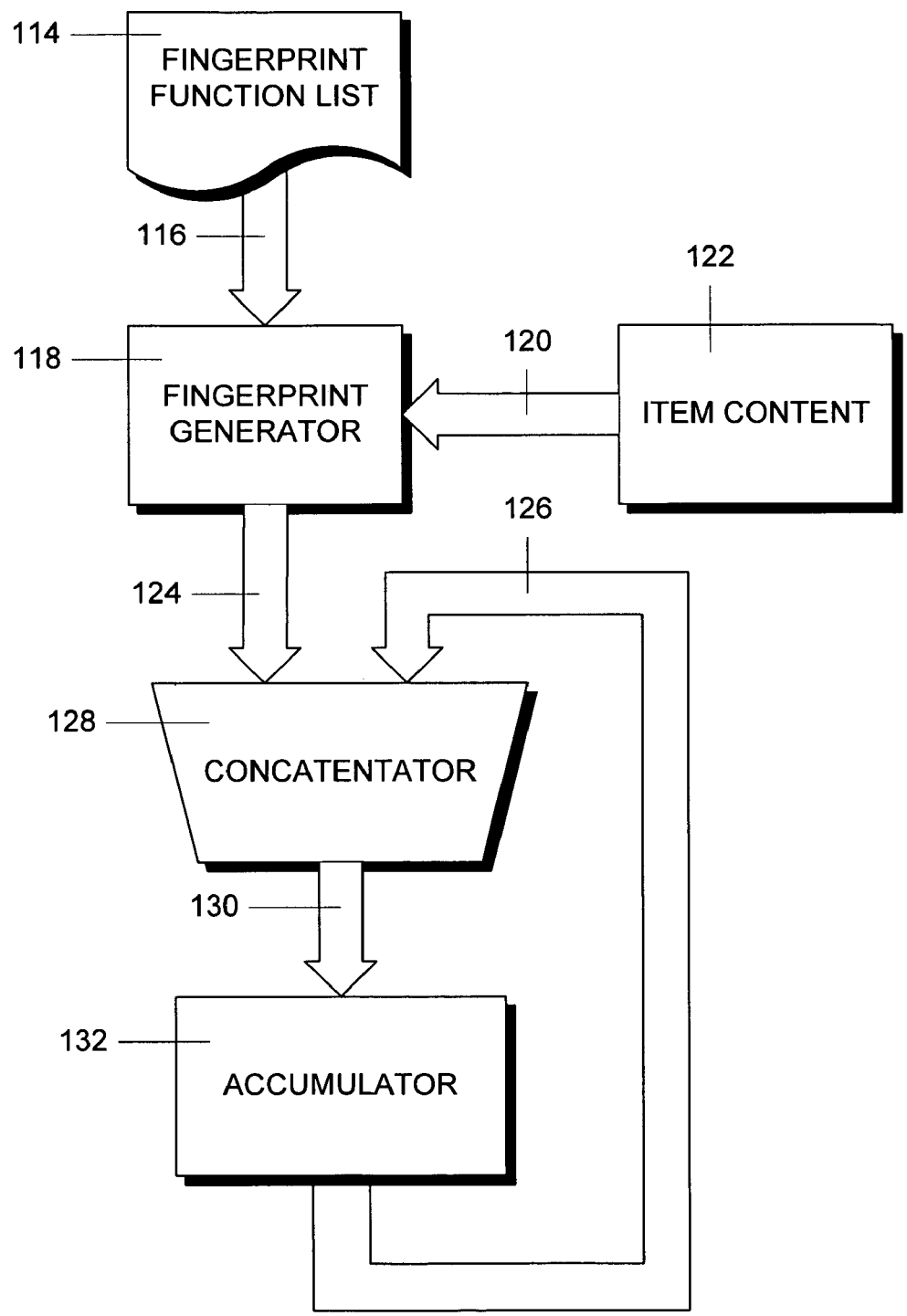
FIG. 1B is a block schematic diagram illustrating the generation of an extensible fingerprint, such as that shown in FIG. 1A, in accordance with the principles of the invention.
Figure 2:
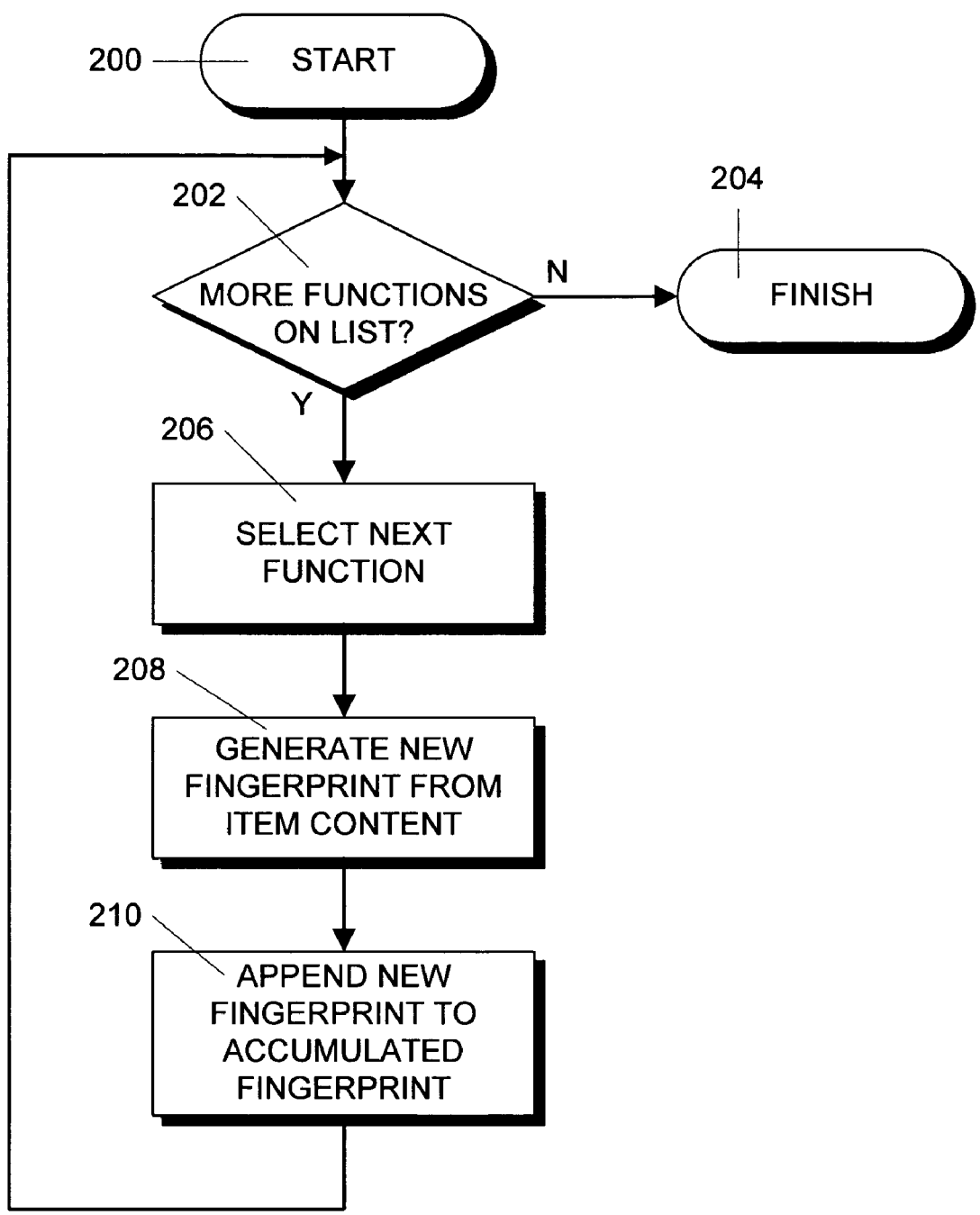
FIG. 2 is a flowchart showing the steps in an illustrative process for the generation of an extensible fingerprint using the system of FIG. 1B.

The process of generating a fingerprint using such an extensible fingerprinting function is illustrated in FIG. 1B and the steps in the process are illustrated in the flowchart of FIG. 2. The process begins in step 200 and proceeds to step 202 where a determination is made whether additional fingerprinting functions on the list of fingerprinting functions 114 remain to be processed. If so, in step 204, the next function is selected from the list 114 and applied to a fingerprint generator 118 as schematically indicated by arrow 116. The fingerprint generator 118 is supplied with the item content 122 as indicated schematically by arrow 120 and uses the content along with the fingerprint function to generate a fingerprint as indicated schematically by arrow 124 and as indicated in step 208. Next, in step 210, the newly-generated fingerprint is appended to the composite fingerprint information in accumulator 132. In particular, the newly-generated fingerprint indicated by arrow 124 is applied to a concatentor 128. Concatentor 128 also receives the composite output of accumulator 132 as indicated schematically by arrow 126. The appended result replaces the contents of accumulator 132 as indicated schematically by arrow 130.

After completing step 210 the process proceeds back to step 202 where a determination is made whether any additional fingerprinting functions remain to be processed. If so, operation continues in the manner discussed above, until all fingerprinting functions have been processed. The process then finishes in step 204. At this point, the extensible fingerprint is stored in accumulator 132.

In the context of content-addressed storage, an extensible fingerprint can be used as the address at which an item containing content from which the extensible fingerprint was calculated, as described above, is stored. The fact that the fingerprinting function may change over time means that a server that maintains the fingerprinting functions must continually and publicly advertise the fingerprinting functions so that clients are able to discover the functions when they are needed. There are well-known techniques for accomplishing this advertisement using conventional lookup services such as the Jini™ lookup service developed and marketed by Sun Microsystems, Inc.

In order to use the inventive extensible fingerprint function in a storage system, associated lookup and put protocols are necessary. In the discussion below of these protocols, an assumption has been made that issues of access control are handled elsewhere. Thus, in the examples of the lookup and put operations, no steps have been included for checking whether the client has sufficient authority to perform the requested operation. This is a very interesting topic in the context of content-addressed storage, but not relevant to the discussion of extensible fingerprinting as presented below.

Figure 4:
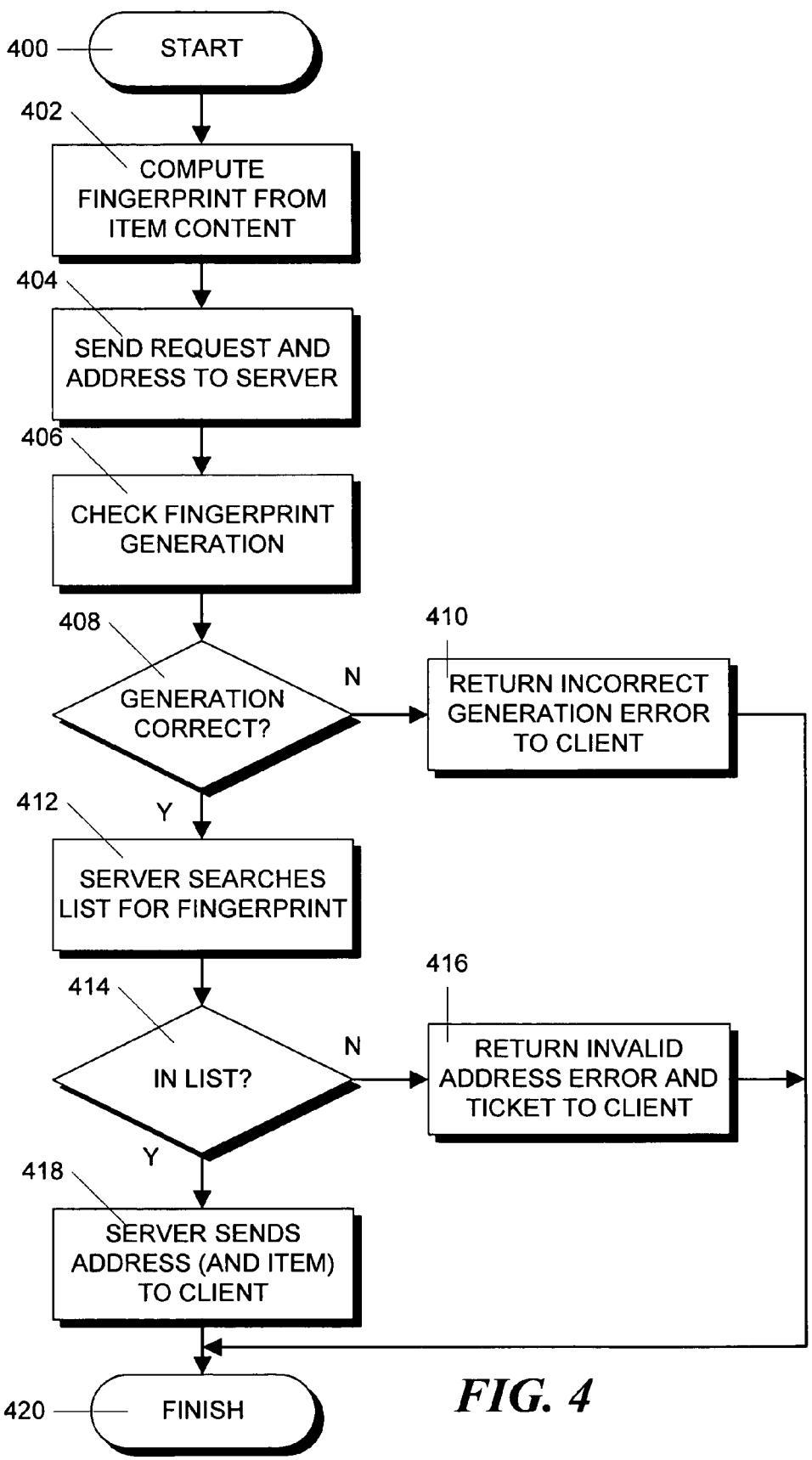
FIG. 4 is a flowchart showing the steps in an illustrative process involved in a lookup operation in the content-addressed storage system shown in FIG. 3.

A lookup operation in a content-addressed storage system 300 operating with the inventive extensible fingerprints used as addresses is shown schematically in FIG. 3 and the steps in the process are illustrated in FIG. 4. In the discussion below the term "address" is used. Such an address comprises the aforementioned extensible fingerprint, although it may also include other information. The process begins in step 400 and process to step 402 where the client 302 computes the fingerprint of the item it wishes to store. In order to do this it applies the content of the item to a fingerprint generator 316 as indicated schematically by arrow 312. The fingerprint generator 316 also may use a copy of the fingerprint function list 320 that is maintained by storage server 306 and uses the fingerprint functions of that list to compute an extensible fingerprint as described above with respect to FIGS. 1 and 2. The extensible fingerprint is then used as the address for the item.

Next, in step 404, the client 302 sends a read request and the address thus calculated to the server 306 as indicated schematically by arrow 304. In step 406 and upon receiving the request and address, the server 306 checks the generation of the fingerprint. If, as determined in step 408, the fingerprint uses an older generation of the fingerprinting function than the server 306 is using, the lookup is rejected and in step 410 an incorrect generation error is returned to the client 302. The process then finishes in step 420. The client may then acquire the new fingerprinting function and retry the lookup operation. As previously mentioned, the client 302 can obtain the fingerprint function list from server 306 by means of a conventional lookup service (not shown) as indicated schematically by arrow 318.

If the fingerprint generation is correct as determined in step 408, the server 306 compares the fingerprint to a list of fingerprints 308 for items it already stores as indicated schematically by arrow 307. If the fingerprint is in list 308 as determined in step 414, then the process proceeds to step 418 where the server 306 sends a copy of its address for the item to the client 302 as indicated schematically by arrow 314. If the request was a read request and the client 302 has proper authority to access the item, the server 306 may optionally provide a copy of the stored item to the client 302. Once the client has received the item it may optionally compute the fingerprint from the item content to check that the item it received is correct (not shown in FIG. 3 or 4).

If the server 306 determines, in step 414, that the fingerprint supplied by the client 302 is not in the list 308, then, in step 416, the server 306 informs the client 302 that the server 306 has no such item by returning, in step 416, an invalid address error to the client 302 and a ticket containing a fingerprint that allows the client to subsequently send that item to the server for storage.

In order to for the client to retrieve an item using the above lookup or read operation, the address presented by the client must be valid (that is, supplied by the server). However, in accordance with the principles of the invention, once an address becomes valid, it remains valid even if the fingerprinting function changes. For example, using the notation above, a client writes an item α. The client receives a valid address from the server containing $X_i(\alpha)$. Then, assume that the fingerprinting function is extended from $X_i$ to $X_{i+1}$. The client can later read the item α using the address $X_i(\alpha)$ which is still valid.

A second example illustrates a more complicated case. First, α client writes an item α. The client receives a valid address from the server containing $X_i(\alpha)$. Next, assume that the fingerprinting function is extended from $X_i$ to $X_{i+1}$ and that another, second client attempts to write the item α. In response to the second write request, the server adds the item a to the system and returns the valid address $X_{i+1}(\alpha)$ to the second client. The server will also detect that an item with address $X_i(\alpha)$ already exists (and there can be at most one such item, unless a collision for the item a occurred before the fingerprinting function was extended) and check whether its list of valid addresses should be updated. If appropriate, the server may replace the more recent item with a link to the original item.

At the end of this example, the two clients have a slightly inconsistent view of the world: the first client has address $X_i(\alpha)$ and the second client has address $X_{i+1}(\alpha)$ for the same item. If the two clients wish to use these addresses to determine whether they represent the same item, there are several possibilities to consider.

If one of the addresses is not a prefix of the other, then the items are not the same. If one of the addresses is a prefix of the other, then the items might be the same. If the clients have confidence that the fingerprinting functions used by the shorter address are still collision-resistant, then they may assume that the items are identical. However, if one of the addresses is a prefix of the other, and the collision-resistance of the fingerprinting function that was used to create the shorter address is believed to be weak, then the two clients can ask the server to validate the two addresses (which will return the most up-to-date fingerprint for each). This may require blocking until the address tables are updated (if the server is still in the midst of updating its address tables immediately after the second write from the previous example). The delay caused by this blocking is no worse than the delay required to compare the items bit-by-bit (and perhaps faster, because all of the data is local to the server and need not travel over a network to reach the clients).

Figure 6:
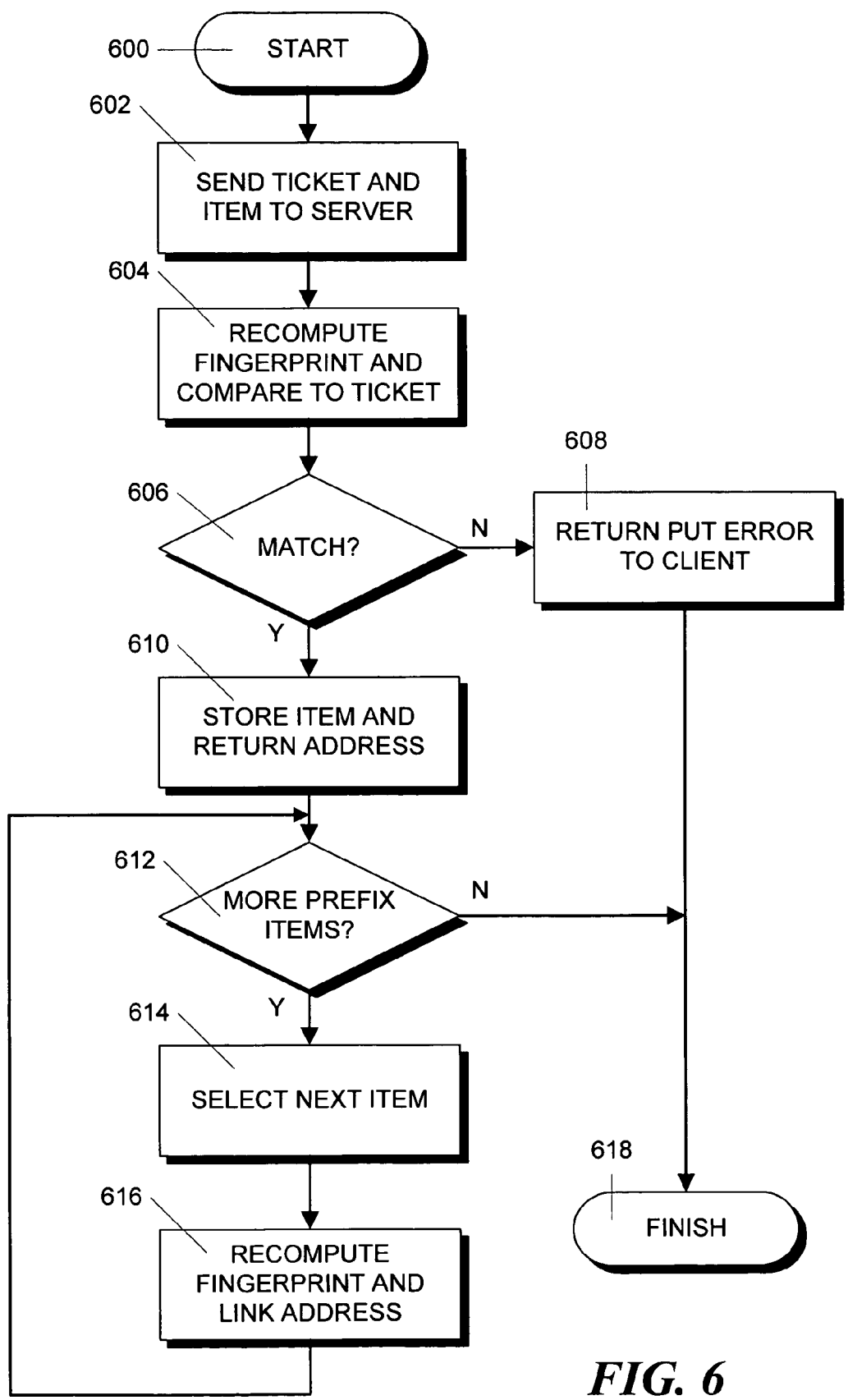
FIG. 6 is a flowchart showing the steps in an illustrative process involved in a put operation in the content-addressed storage system shown in FIG. 5.

A put operation in a content-addressed storage system 500 operating with the inventive extensible fingerprints is shown schematically in FIG. 5 and the steps in the process are illustrated in FIG. 6. The process begins in step 600 and process to step 602 where the client 502 sends a ticket received from a preceding lookup operation and the item to be written to the server 506 as indicated schematically by arrow 504. Once the server has the item, in step 604, it computes the fingerprint from the item content and compares that fingerprint to the fingerprint in the ticket received from the client 502. In particular, the server 506 provides the item content to a fingerprint generator 530 as indicated schematically by arrow 528. The fingerprint generator 530 also receives fingerprint functions from the fingerprint function list 522 that is maintained by the server 506 and computes the fingerprint as described above with respect to FIGS. 1 and 2.

If, as determined in step 606, there is no match between the fingerprint in the ticket and the fingerprint computed by the server from the item content, the process proceeds to step 608 where the server 506 rejects the put operation by returning a put error to the client as indicated schematically by arrow 516. The process then finishes in step 618.

Alternatively, if, in step 606, a match is found, then the process proceeds to step 610 where the server 506 writes the item to the item store 524 and sends a copy of the valid address to the client 502 as indicated schematically by arrows 526 and 516, respectively.

Next, as a background process, the server 506 updates older generation fingerprints that are related to the fingerprint of the item just processed. In particular, in step 612, a determination is made whether any other items exist that have fingerprints that are prefixes of the fingerprint of the newly-written item by examining address list 508 as indicated schematically by arrow 510. If not, the process finishes in step 618.

Alternatively, is a determined is made in step 616 that such items exist, the process proceeds to step 614 where the next such item is selected for processing. A new fingerprint is computed for the selected item in step 616 using the current fingerprinting function and a link is entered from the new address to the old address generated by the old fingerprint. The process then returns to step 612 to determine if additional items need processing. Operation continues in this manner until all items have been processed. The process then finishes in step 618.

Note that the put operation described above assumes that a collision did not occur during the write of the item to the item store 524 in step 610. If a collision does occur, then the new content will not be written, but the client 502 has no way of detecting that the item was not written. Moreover, the collision will not be detected by the preceding lookup operation described above because, as soon as the lookup operation tells the client 502 that the fingerprint is already known to the server 506, the lookup operation ends. However, some applications will require that collisions be detected and resolved (via a separate protocol, possibly requiring the immediate extension of the fingerprinting function).

There are two simple approaches to detect and resolve collisions. First, if a lookup operation finds a match, then the client can read the item and verify whether or not the item matches the item that the client wishes to write. If not, then the client can tell the server that a collision has been detected (and send its own item to the server as proof. At that point, either the fingerprinting function can be updated or the client can abandon the write (possibly retrying the put operation with a small "salt" value added to the item content). However, this approach may not be feasible if the client does not have sufficient authority to view the item.

Second, if the lookup operation finds a match, then the client can immediately send the item to the server and let the server determine whether or not a collision has occurred. The server informs the client of the outcome. This approach can be used even if the client does not have authority to view the item, but, in both of the above approaches, in order to detect a collision, extra data must be sent between the client and the server. However, in the first approach, the direction of the communication is the opposite of the expected case, when no collision is detected. This may have value in networks that have asymmetric performance properties (such as DSL, cable, or fibre-to-the-home, where downloads are typically an order of magnitude faster than uploads). Thus, it might be best to implement both approaches and use each according to security and performance concerns.

The benefits of the inventive extensible fingerprints include its dynamic nature. Thus, the inventive fingerprinting function can evolve and always represent the current, best-known fingerprinting technology. Unlike fixed conventional fingerprinting functions, which grow more susceptible to attack as time goes on, an extensible fingerprinting function may actually become stronger. The amount of work required to update a content-addressed storage server when a new fingerprinting function is chosen is low and may be performed incrementally as items are rewritten. Fingerprints from earlier generations of the fingerprinting function remain valid throughout the life of the system and provide efficient means to compare old fingerprints with new fingerprints.

A software implementation of the above-described embodiment may comprise a series of computer instructions either fixed on a tangible medium, such as a computer readable media, for example, a diskette, a CD-ROM, a ROM memory, or a fixed disk, or transmittable to a computer system, via a modem or other interface device over a medium. The medium either can be a tangible medium, including but not limited to optical or analog communications lines, or may be implemented with wireless techniques, including but not limited to microwave, infrared or other transmission techniques. It may also be the Internet. The series of computer instructions embodies all or part of the functionality previously described herein with respect to the invention. Those skilled in the art will appreciate that such computer instructions can be written in a number of programming languages for use with many computer architectures or operating systems. Further, such instructions may be stored using any memory technology, present or future, including, but not limited to, semiconductor, magnetic, optical or other memory devices, or transmitted using any communications technology, present or future, including but not limited to optical, infrared, microwave, or other transmission technologies. It is contemplated that such a computer program product may be distributed as a removable media with accompanying printed or electronic documentation, e.g., shrink wrapped software, pre-loaded with a computer system, e.g., on system ROM or fixed disk, or distributed from a server or electronic bulletin board over a network, e.g., the Internet or World Wide Web.

Although an exemplary embodiment of the invention has been disclosed, it will be apparent to those skilled in the art that various changes and modifications can be made which will achieve some of the advantages of the invention without departing from the spirit and scope of the invention. For example, it will be obvious to those reasonably skilled in the art that, in other implementations, various algorithms could be used to generate the fingerprints. In addition, methods other than appending may be used to construct the final fingerprint from the various functions used to generate the fingerprint. The order of the process steps may also be changed without affecting the operation of the invention. Other aspects, such as the specific process flow, as well as other modifications to the inventive concept are intended to be covered by the appended claims.

What is claimed is:

1. A method of operating a content-addressed storage system having a storage in which a client stores content of an item in the storage at a location determined by an address, the method comprising:
   (a) at a location of the client, generating an address from a list of fingerprint functions by using each fingerprinting function on the list to generate a fingerprint from the entire item content and forming an ordered list of the generated fingerprints to produce the address, the list of fingerprint functions including a plurality of different fingerprinting functions;
   (b) presenting the address to the storage system; and
   (c) based on the address, storing the item content in the storage,
   wherein the list of fingerprint functions represents an extensible fingerprint function having a current generation, the extensible fingerprint function defined in terms of earlier generations of extensible fingerprint functions, and wherein the ordered list of the generated fingerprints represents an extensible fingerprint at the current generation, such that it is possible to identify an extensible fingerprint of an immediately earlier generation from the extensible fingerprint of the current generation without having access to the item content.

2. The method of claim 1 wherein the address has a generation equal to a length of the ordered list and wherein step (c) further comprises:
   (c1) when the generation of the address is equal to a current generation in use in the storage system, checking whether the address corresponds to a address of an item already stored in the storage system; and
   (c2) when the address corresponds to an address of an item already stored in the storage system, returning to the client an address of the already-stored item.

3. The method of claim 2 wherein step (c) further comprises:
   (c3) when the generation of the address is not equal to the current generation in use in the storage system, returning an error to the client.

4. The method of claim 2 further comprising:
   (c3) when the address does not correspond to an address of any item already stored in the storage system, returning an error and a ticket that includes the address.

5. The method of claim 4 wherein step (c) further comprises:
   (c4) presenting the item content and the ticket to the storage system;
   (c5) at the storage system, generating an address from a list of fingerprint functions by using each fingerprinting function on the list to generate a fingerprint from the item content and forming an ordered list of the generated fingerprints to produce the address; and
   (c6) when the address generated in step (c5) matches the address contained in the ticket, storing the item content in the storage system in a location determined by the address and returning that address to the client.

6. The method of claim 5 wherein step (c) further comprises:
   (c7) when the address generated in step (c5) does not match the address contained in the ticket, returning an error to the client.

7. The method of claim 5 wherein step (c) further comprises:
   (c8) examining addresses of items already stored in the storage system, selecting those addresses that are prefixes of the address contained in the ticket and re-computing the selected addresses using a fingerprinting function currently in use in the storage system.

8. A content-addressed storage system having a storage in which a client stores content of an item in the storage at a location determined by an address, the storage system comprising:
   a fingerprint generator at a location of the client that generates an address from a list of fingerprint functions by using each fingerprinting function on the list to generate a fingerprint from the entire item content and forming an ordered list of the generated fingerprints to produce the address, the list of fingerprint functions including a plurality of different fingerprinting functions;
   a mechanism that presents the address to the storage system; and
   a mechanism that, based on the address, stores the item content in the storage,
   wherein the list of fingerprint functions represents an extensible fingerprint function having a current generation, the extensible fingerprint function defined in terms of earlier generations of extensible fingerprint functions, and wherein the ordered list of the generated fingerprints represents an extensible fingerprint at the current generation, such that it is possible to identify an extensible fingerprint of an immediately earlier generation from the extensible fingerprint of the current generation without having access to the item content.

9. The storage system of claim 8 wherein the address has a generation equal to a length of the ordered list and wherein the mechanism that stores the item content further comprises:
   a mechanism, operable when the generation of the address is equal to a current generation in use in the storage system, that checks whether the address corresponds to a address of an item already stored in the storage system; and
   a mechanism, operable when the address corresponds to an address of an item already stored in the storage system, that returns to the client an address of the already-stored item.

10. The storage system of claim 8 wherein the mechanism that stores the item content further comprises an error mechanism, operable when the generation of the address is not equal to the current generation in use in the storage system, that returns an error to the client.

11. The storage system of claim 8 further comprising an error mechanism, operable when the address does not correspond to an address of any item already stored in the storage system, that returns an error and a ticket that includes the address.

12. The storage system of claim 11 wherein the mechanism that stores the item content further comprises:

a mechanism that presents the item content and the ticket to the storage system;

a second fingerprint generator, located at the storage system, that generates an address from a list of fingerprint functions by using each fingerprinting function on the list to generate a fingerprint from the item content and forming an ordered list of the generated fingerprints to produce the address; and a mechanism, operable when the address generated by the second fingerprint generator matches the address contained in the ticket, that stores the item content in the storage system in a location determined by the address and returns that address to the client.

13. The storage system of claim 12 wherein the error mechanism further comprises:

a mechanism operable when the address generated by the second fingerprint generator does not match the address contained in the ticket, that returns an error to the client.

14. The storage system of claim 12 wherein the mechanism that stores the item content further comprises a mechanism that examines addresses of items already stored in the storage system, selects those addresses that are prefixes of the address contained in the ticket and re-computes the selected addresses using a fingerprinting function currently in use in the storage system.

* * * * *

UNITED STATES PATENT AND TRADEMARK OFFICE
CERTIFICATE OF CORRECTION

PATENT NO. : 7,844,774 B2  
APPLICATION NO. : 11/280502  
DATED : November 30, 2010  
INVENTOR(S) : Daniel J. Ellard Page 1 of 1

It is certified that error appears in the above-identified patent and that said Letters Patent is hereby corrected as shown below:

Column 11, Line 41, Claim 2:  
Delete "a address" and insert -- an address --.

Column 12, Line 48, Claim 9:  
Delete "a address" and insert -- an address --.

Signed and Sealed this  
Fifteenth Day of February, 2011

David J. Kappos  
*Director of the United States Patent and Trademark Office*